United States Patent Office 3,132,045
Patented May 5, 1964

3,132,045
METHOD OF IMPREGNATING FILM MATERIALS WITH AMMONIUM BROMIDE
Richard L. Hill, Williamsburg, Va., assignor to The Dow Chemical Company, Midland, Mich., a corporation of Delaware
No Drawing. Filed Oct. 26, 1961, Ser. No. 147,737
5 Claims. (Cl. 117—138)

This invention relates to treatment of plastic film. It more particularly relates to a method of making an alkenyl aromatic film and pellicles fire retardant and a fire retardant film and pellicles.

The invention is particularly adapted to be practiced with swellable, integral, solid styrene polymer film, sheets, granules and the like. Such a polymer, which may have an essentially linear molecular configuration or be in a cross-linked form, is employed herein as being generally representative of alkenyl aromatic compounds of the type that contain at least about 50 weight percent of at least one polymerized alkenyl aromatic compound or monomer having the general formula: $Ar-CR=CH_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic copolymers and polymers of styrene and polymers and copolymers of alpha-methyl styrene, ar-methyl styrene (or vinyl toluene), the several mono- and di-chlorostyrenes and ar-dimethyl styrenes, including copolymers thereof with such materials as vinylidene chloride and acrylonitrile; cross-linked polyfunctional substances as divinyl benzene; and graft copolymers with other polymeric substances (such as other elastomeric polymers) can frequently be utilized with benefits commensurate with or in excess of those which are derivable from employment of polystyrene alone.

A wide variety of methods are employed in order to render such alkenyl aromatic resins self-extinguishing. By the term "self-extinguishing" is meant that a flame is applied to an article being evaluated in an air atmosphere. When the material is clearly and obviously burning, the flame is removed therefrom. If, within a period of about 20 seconds, the plastic article ceases to burn, it is considered to have self-extinguishing characteristics.

Various additives are incorporated in the alkenyl aromatic resins to provide self-extinguishing characteristics such as phosphate derivatives, halogen-containing compounds, as well as compounds containing both halogen and nitrogen. Typical of these is ammonium bromide which often is incorporated into a thermoplastic material by milling the plastic while in a viscous state and adding thereto a finely divided fire retardant, to provide a dispersion of the particulate material throughout the plastic. The incorporation of the particulate fire retardant within a clear or transparent body usually results in a distinct haze or cloudiness, and often in an opaque sheet.

It is an object of this invention to provide a transparent alkenyl aromatic film having self-extinguishing properties.

It is a further object to render an alkenyl aromatic resinous film self-extinguishing.

It is another object to provide a method which would permit rendering shaped alkenyl aromatic articles self-extinguishing without significantly decreasing the transparency thereof or significantly altering their shape.

These objects and other advantages are achieved in accordance with the method of the invention by exposing an alkenyl aromatic resinous body to an atmosphere of hydrogen bromide and subsequently exposing said treated alkenyl aromatic resinous body containing hydrogen bromide to an atmosphere containing ammonia until ammonium bromide has formed within said body.

Also contemplated within the scope of the invention is an alkenyl aromatic resinous shaped article having uniformly dispersed therein from about 4 to about 10 percent by weight of the alkenyl aromatic resinous article ammonium bromide formed in situ, as sufficiently small particles that the article appears transparent.

Beneficially, anhydrous hydrogen bromide is employed in the practice of the invention. This material is prepared in substantially pure states by methods well known to the art, although the presence of small quantities of such impurities as water and the like are not detrimental. The ammonia utilized can be either anhydrous or a mixture of ammonia and water vapor.

The alkenyl aromatic resinous shaped article is readily impregnated with the ammonium bromide at temperatures of from about 0° to as high as 85° centigrade by permitting the article to stand in an atmosphere containing the hydrogen bromide. The rate of impregnation will vary with temperature, the concentration of the hydrogen bromide, and the absolute pressure of the atmosphere. Beneficially, for most rapid treatments, higher concentrations and higher pressures are preferred, but for many practical applications the natural proportion of hydrogen bromide in an air atmosphere as determined by the vapor pressure at the temperature of treatment is adequate and oftentimes beneficial. More rapid impregnation of the film is obtained under higher pressures, however, higher concentrations are obtained at lower temperatures. At lower temperatures, the tendency of the hydrogen bromide to diffuse from the alkenyl aromatic resin is less. Beneficially pressures in the range of about one-half to about 5 atmospheres are employed.

Generally, only sufficient hydrogen bromide should be introduced into the film to form from about 4 to about 10 parts by weight of the ammonium bromide per 100 parts by weight of resin when the article is subsequently treated with an atmosphere containing ammonia. Most advantageously from about 4 to 8 parts are sufficient to impart self-extinguishing characteristics with good clarity. The amount of ammonium bromide entering film may readily be determined by weighing the shaped article or film. In the case of treating a continuous thin web, a highly concentrated atmosphere of hydrogen bromide may be employed and the residence time of the film within the chamber containing the hydrogen bromide atmosphere and temperature are used to control the amount of impregnation.

Generally, a rapid impregnation will take place using high concentrations of hydrogen bromide, high temperature, and pressure while the lower rates are achieved at lower temperatures and using lower concentrations of the bromide. The formation of the ammonium bromide is governed by the same principles as is the absorption of the hydrogen bromide by the alkenyl aromatic article. Generally, if the resinous article has been treated at a high temperature, it is advantageous to immediately transfer it to a chamber containing an atmosphere of the basic nitrogen compound in order to minimize loss by diffusion of the halide from the article. Transfer of the shaped article of one atmosphere to another is readily done at lower temperatures without significant loss as the rate of diffusion of the hydrogen bromide from the article is correspondingly slower. Thus, in certain circumstances, it is found to be beneficial to impregnate the film beyond the desired level and to subsequently obtain the desired concentration by permitting the excess portion of the hydrogen bromide to diffuse from the film prior to treatment with ammonia.

Advantageously, the hydrogen bromide containing alkenyl aromatic resinous article is subjected to a very brief exposure to a current of a substantially inert atmosphere (such as air, nitrogen and the like) immediately prior to exposure to the ammonia atmosphere. This exposure prevents a translucent deposit of ammonium bromide from forming on the surface of the article. The surface deposit, if formed, is readily removed by wiping or washing to leave a clear and transparent ammonium bromide impregnated article.

The burst strength and elongation of sheet or film impregnated with ammonium bromide in accordance with the invention appears to be unchanged from that of the untreated material. Surface and volume resistivity, moisture and oxygen transmission of the treated product are not greatly altered by impregnation. Ammonium bromide formed by the present invention within an alkenyl aromatic resinous article is relatively permanent, as the concentration of the extinguishing agent is altered only very slightly by extended leaching in water. Quantities of ammonium bromide in excess of the acceptable limits are readily incorporated in alkenyl aromatic resins by this method. However, such excess concentrations are undesirable as the articles lose their transparency and become translucent. In concentrations below the acceptable limits the treatment is not effective in producing a self-extinguishing article.

The invention is further illustrated, but not limited, by the following examples:

*Example I*

A polystyrene film having a thickness of about 1 mil was exposed to dry hydrogen bromide gas at an absolute pressure of about 1 atmosphere in a closed vessel at a temperature of about 22° centigrade for a period of about 3 minutes. The polystyrene film-containing hydrogen bromide was exposed to air for about 2 seconds, transferred to a wet ammonia atmosphere having a temperature of about 22° centigrade for a period of about 4 minutes. The film was removed from the ammonia atmosphere and dried and was found to contain about 3.3 percent by weight (based on the weight of the polystyrene) of ammonium bromide. The ammonium bromide containing film was exposed to hydrogen bromide and ammonia under the above conditions. The twice treated film contained 6.5 percent ammonium bromide. A portion of the treated film containing 6.5 percent ammonium bromide was placed in a Bunsen burner flame until it was burning. On removal from the Bunsen burner flame, the film ceased burning after about 18 seconds. The resultant film was found to be clear, transparent, and self-extinguishing.

*Example II*

In a manner similar to Example I, a polystyrene film of about 1 mil thickness was treated with anhydrous hydrogen bromide and wet ammonia vapors until an ammonium bromide concentration of about 7.8 percent was obtained. The resultant film was found to be a clear, transparent and self-extinguishing film.

In a similar manner, alkenyl aromatic resin articles up to about 100 mils in thickness such as those prepared from vinyl toluene, copolymers of styrene and methyl methacrylate, copolymers of styrene and vinyl toluene, tertiary butyl styrene, and the like are readily impregnated with ammonium bromide to provide self-extinguishing transparent shaped articles.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. The method of treating an alkenyl aromatic resinous body comprising exposing said resinous body to an atmosphere of hydrogen bromide and subsequently exposing said treated alkenyl aromatic resinous body containing hydrogen bromide to an atmosphere containing ammonia to form within said body from about 4 to 10 grams of ammonium bromide per hundred grams of alkenyl aromatic resin.

2. The method of claim 1, including the step of exposing the alkenyl aromatic resinous body to air for a length of time sufficient to remove at least a major portion of the hydrogen bromide atmosphere adjacent the surface of the body after exposure to hydrogen bromide and prior to exposure to ammonia.

3. The method of treating a polystyrene body comprising exposing said polystyrene body to an atmosphere of hydrogen bromide and subsequently exposing said treated polystyrene body containing hydrogen bromide to an atmosphere containing ammonia to form within said body from about 4 to 10 grams of ammonium bromide per hundred grams of polystyrene.

4. A clear, transparent alkenyl aromatic shaped article having a thickness up to about 100 mils having uniformly dispersed therein from about 4 to about 10 parts by weight of ammonium bromide per 100 parts by weight of said article.

5. The article of claim 4, wherein said resin is polystyrene.

References Cited in the file of this patent

UNITED STATES PATENTS

| | | |
|---|---|---|
| 2,676,927 | McCurdy et al. | Apr. 27, 1954 |
| 2,676,946 | McCurdy et al. | Apr. 27, 1954 |
| 3,001,954 | Buchholz et al. | Sept. 26, 1961 |
| 3,027,272 | Ratzel | Mar. 27, 1962 |
| 3,050,424 | Schmitt | Aug. 21, 1962 |
| 3,050,476 | Tress et al. | Aug. 21, 1962 |
| 3,058,927 | McMaster et al. | Oct. 16, 1962 |

UNITED STATES PATENT OFFICE
CERTIFICATE OF CORRECTION

Patent No. 3,132,045 May 5, 1964

Richard L. Hill

It is hereby certified that error appears in the above numbered patent requiring correction and that the said Letters Patent should read as corrected below.

Column 4, line 40, after "having", second occurrence, strike out "uniformly".

Signed and sealed this 3rd day of November 1964.

(SEAL)
Attest:

ERNEST W. SWIDER
Attesting Officer

EDWARD J. BRENNER
Commissioner of Patents